US012809572B2

(12) United States Patent
Ikeuchi et al.

(10) Patent No.: US 12,809,572 B2
(45) Date of Patent: Nov. 24, 2026

(54) NOTIFICATION SYSTEM, NOTIFICATION METHOD, SERVER DEVICE, AND SPEECH DEVICE

(71) Applicant: Panasonic Intellectual Property Management Co., Ltd., Osaka (JP)

(72) Inventors: Hiromu Ikeuchi, Hyogo (JP); Masahiro Ishii, Hyogo (JP); Sara Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 302 days.

(21) Appl. No.: 18/708,125

(22) PCT Filed: Sep. 21, 2023

(86) PCT No.: PCT/JP2023/034278

§ 371 (c)(1),
(2) Date: May 7, 2024

(87) PCT Pub. No.: WO2025/062566

PCT Pub. Date: Mar. 27, 2025

(65) Prior Publication Data

US 2026/0169674 A1 Jun. 18, 2026

(51) Int. Cl.
*G06F 3/16* (2006.01)

(52) U.S. Cl.
CPC .................................... *G06F 3/162* (2013.01)

(58) Field of Classification Search
CPC ....................................................... G06F 3/162

(Continued)

(56) References Cited

U.S. PATENT DOCUMENTS 9,118,977 B2 * 8/2015 Onishi ............... H04N 21/8547
11,665,757 B2 * 5/2023 Hatambeiki ........ G06F 9/44526
455/41.1

(Continued)

FOREIGN PATENT DOCUMENTS

JP 2008-046424 A 2/2008
JP 2016134038 A * 7/2016
JP 2017069836 A * 4/2017 ............. G06F 3/167

OTHER PUBLICATIONS

International Search Report dated Dec. 5, 2023 issued in International Patent Application No. PCT/JP2023/034278.

*Primary Examiner* — Eric Blount
(74) *Attorney, Agent, or Firm* — Rimon P.C.

(57) ABSTRACT

A server device includes: a communicator that transmits at least part of sound source data to a speech device before an event occurs in an information source device; a determiner that determines whether the event has occurred in the information source device based on an operation log from the information source device; and an instructor that provides, via the communicator, when the determiner determines that the event has occurred in the information source device, an instruction to the speech device to reproduce the at least part of sound source data. The speech device includes: a communicator that receives the at least part of sound source data from the server device; a storage that stores the at least part of sound source data received; and a reproducer that reproduces the at least part of sound source data stored based on an instruction provided by the instructor of the server device.

5 Claims, 6 Drawing Sheets

(58) Field of Classification Search
USPC .......................................................... 340/692
See application file for complete search history.

(56) References Cited

U.S. PATENT DOCUMENTS

| | | | | |
|---|---|---|---|---|
| 12,142,256 | B2 * | 11/2024 | Tsukamoto | G10L 13/047 |
| 2008/0177822 | A1 * | 7/2008 | Yoneda | H04N 21/43615 709/202 |
| 2010/0058186 | A1 * | 3/2010 | Takai | G11B 27/105 706/54 |
| 2012/0042047 | A1 * | 2/2012 | Chen | H04N 21/4305 709/219 |
| 2019/0132671 | A1 * | 5/2019 | Yoon | H04R 1/2896 |
| 2021/0368562 | A1 * | 11/2021 | Hatambeiki | H04W 8/005 |

* cited by examiner

NOTIFICATION SYSTEM, NOTIFICATION METHOD, SERVER DEVICE, AND SPEECH DEVICE

This application is the U.S. National Phase under 35 U.S.C. § 371 of International Patent Application No. PCT/JP2023/034278, filed on Sep. 21, 2023, the entire disclosure of which Application is incorporated by reference herein.

TECHNICAL FIELD

The present disclosure relates to notification systems, notification methods, server devices, and speech devices.

BACKGROUND ART

A speech device is known which has a speech function of emitting a voice by reproducing sound source data (see, for example, Patent Literature (PTL) 1). When an event occurs in an information source device, this type of speech device emits a voice for notifying a user of the occurrence of the event. In this way, the user recognizes the occurrence of the event in the information source device.

CITATION LIST

Patent Literature

[PTL 1] Japanese Unexamined Patent Application Publication No. 2008-46424

SUMMARY OF INVENTION

Technical Problem

The present disclosure provides a notification system, a notification method, a server device, and a speech device which can reduce a time lag between occurrence of an event in an information source device and reproduction of sound source data for notifying the occurrence of the event performed by a speech device.

Solution to Problem

A notification system according to the present disclosure includes: an information source device; a speech device that emits a voice; and a server device that communicates with the information source device and the speech device via a network, the information source device includes a first communicator that transmits an operation log indicating an operation history of the information source device to the server device, the server device includes a second communicator that (i) receives the operation log from the information source device and (ii) transmits, to the speech device, before an event occurs in the information source device, at least part of sound source data for notifying that the event has occurred in the information source device by a voice, a determiner that determines whether the event has occurred in the information source device based on the operation log, and an instructor that provides, via the second communicator, when the determiner determines that the event has occurred in the information source device, an instruction to the speech device to reproduce the at least part of sound source data, and the speech device includes a third communicator that receives the at least part of sound source data from the server device, a storage that stores the at least part of sound source data received by the third communicator, and a reproducer that reproduces, based on the instruction provided by the instructor of the server device, the at least part of sound source data stored in the storage.

Advantageous Effects of Invention

In a notification system or the like according to the present disclosure, a time lag can be reduced between occurrence of an event in an information source device and reproduction of sound source data for notifying the occurrence of the event performed by a speech device.

DESCRIPTION OF EMBODIMENTS

Underlying Knowledge Forming Basis of the Present Disclosure

The present inventors have found that the following issue occurs in the conventional technique described in "Background Art".

In the conventional technique described above, each time an event occurs in an information source device, a speech device downloads, from a server device, sound source data for notifying a user of the occurrence of the event, and reproduces the sound source data after the completion of the download. However, since it takes much time to perform the download, a time lag is increased between the occurrence of the event in the information source device and the actual reproduction of the sound source data performed by the speech device, with the result that it is disadvantageously difficult to notify the user of the occurrence of the event in real time.

Hence, the present inventors have conducted thorough study to devise a notification system, a notification method, a server device, and a speech device which can reduce a time lag between occurrence of an event in an information source device and reproduction of sound source data for notifying the occurrence of the event performed by a speech device.

An embodiment will be described in detail below with reference to drawings as necessary. However, a detailed description beyond necessity may be omitted. For example, a detailed description of an already well known matter or a repeated description of substantially the same configuration may be omitted. This is intended for preventing the following description from being unnecessarily redundant and facilitating the understanding of a person skilled in the art.

The present inventors provide accompanying drawings and the following description so that the person skilled in the art fully understands the present disclosure, and they do not intend to limit features recited in the scope of claims.

Embodiment

An embodiment will be described below with reference to FIGS. 1 to 6.

1. Outline of Notification System

Figure 1:
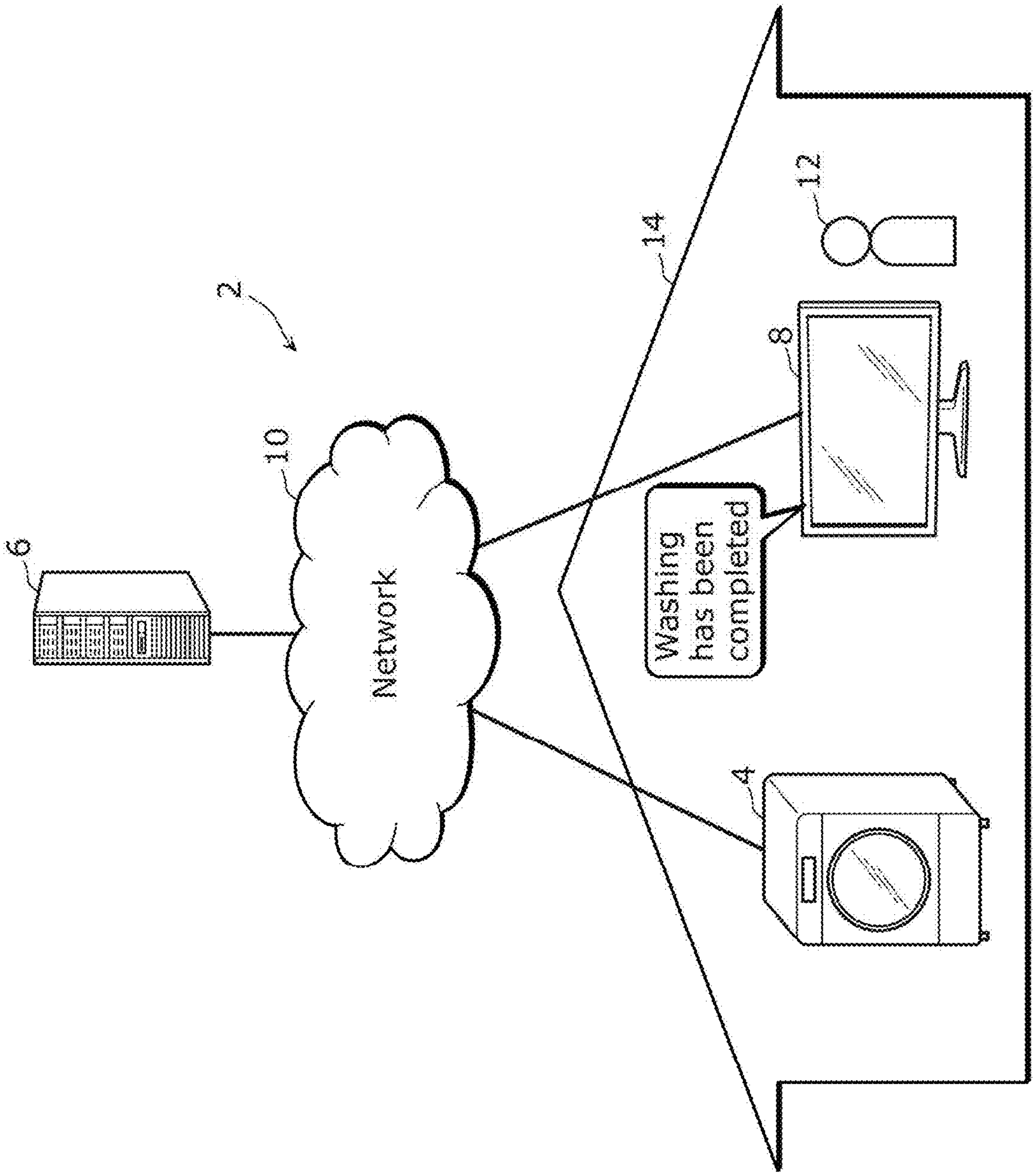
FIG. 1 is a conceptual diagram showing an outline of a notification system according to an embodiment.

An outline of notification system 2 according to the embodiment will first be described with reference to FIG. 1. FIG. 1 is a conceptual diagram showing the outline of notification system 2 according to the embodiment.

As shown in FIG. 1, notification system 2 includes information source device 4, server device 6, and speech device 8. Information source device 4, server device 6, and speech device 8 described above communicates with each other via network 10. Network 10 is, for example, the internet. Information source device 4 and speech device 8 are installed, for example, in home 14 of user 12.

Information source device 4 is a home appliance operated by user 12, and is, for example, a washing machine. While information source device 4 is being operated, information source device 4 transmits an operation log indicating an operation history of information source device 4 to server device 6. Although in the present embodiment, a case where information source device 4 is a washing machine will be described, the present disclosure is not limited to this case, and examples of information source device 4 may include any home appliances such as a television receiver, an air conditioner, a microwave oven, a refrigerator, a rice cooker, an autonomous robot vacuum cleaner, and an air purifier.

Server device 6 is a could server for controlling details of a speech provided by speech device 8. Server device 6 transmits, to speech device 8, before an event (for example, "washing completion") occurs in information source device 4, at least part of sound source data for notifying the occurrence of the event in information source device 4 by a voice. The sound source data is sound source data for the details of a speech which are, for example, "washing has been completed". In the present specification, the "event" means an operation performed by information source device 4, a change in the state of information source device 4, or the like. Server device 6 instructs, when the event occurs in information source device 4, speech device 8 to reproduce the at least part of sound source data.

Speech device 8 is a home appliance which is operated by user 12 and includes loudspeaker 34 (see FIG. 2 which will be described later). Specifically, speech device 8 is a home appliance which has a speech function of emitting a voice from loudspeaker 34, and is, for example, a stationary, wall-mounted, or portable television receiver. Before the event occurs in information source device 4, speech device 8 previously stores the at least part of sound source data from server device 6, and reproduces, based on an instruction provided by server device 6, the at least part of sound source data stored. In this way, speech device 8 emits, for example, a voice in which details of a speed are "washing has been completed, and thus user 12 can recognize the event which has occurred in information source device 4. Although in the present embodiment, a case where speech device 8 is a television receiver will be described, the present disclosure is not limited to this case, and examples of speech device 8 may include any home appliances incorporating a loudspeaker such as an autonomous robot vacuum cleaner, a ceiling light and an intercom handset (so-called door phone).

2. Functional Configuration of Notification System

The functional configuration of notification system 2 according to the embodiment will then be described with reference to FIG. 2. FIG. 2 is a block diagram showing the functional configuration of notification system 2 according to the embodiment.

Figure 2:
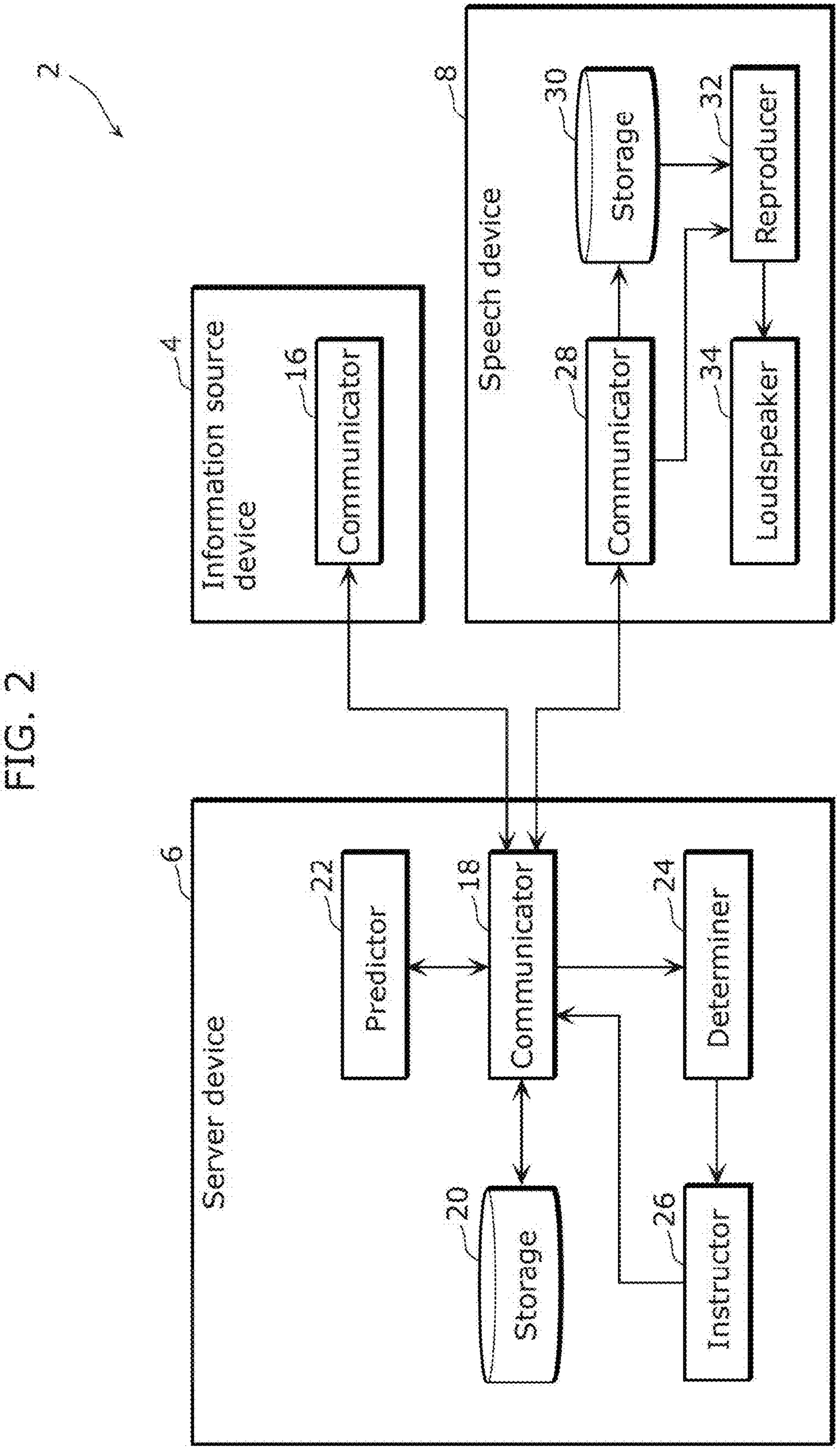
FIG. 2 is a block diagram showing the functional configuration of the notification system according to the embodiment.

As shown in FIG. 2, information source device 4 includes communicator 16 (an example of a first communicator) in the functional configuration. Communicator 16 transmits, via network 10 (see FIG. 1), the operation log indicating the operation history of information source device 4 to server device 6.

As shown in FIG. 2, server device 6 includes, in the functional configuration, communicator 18 (an example of a second communicator), storage 20, predictor 22, determiner 24, and instructor 26.

Communicator 18 transmits and receives, via network 10, various types of data and the like between information source device 4 and speech device 8. Specifically, communicator 18 receives the operation log from information source device 4. Communicator 18 transmits, to speech device 8, before the event occurs in information source device 4, the at least part of sound source data stored in storage 20.

Storage 20 is a memory which stores the sound source data for notifying the occurrence of the event in information source device 4 by a voice.

Predictor 22 predicts timing at which the event occurs in information source device 4 based on the operation log received by communicator 18.

Determiner 24 determines whether the event has occurred in information source device 4 based on the operation log received by communicator 18.

Instructor 26 instructs, via communicator 18, speech device 8 to reproduce the at least part of sound source data when determiner 24 determines that the event has occurred in information source device 4.

As shown in FIG. 2, speech device 8 includes, in the functional configuration, communicator 28 (an example of a third communicator), storage 30, reproducer 32, and loudspeaker 34.

Communicator 28 transmits and receives, via network 10, various types of data and the like between server device 6 and speech device 8. Specifically, communicator 28 receives the at least part of sound source data from server device 6, and stores, in storage 30, the at least part of sound source data received.

Storage 30 is a memory which stores the at least part of sound source data received by communicator 28.

Reproducer 32 reads, based on the instruction provided by server device 6, the at least part of sound source data previously stored in storage 30, and reproduces it. Reproducer 32 discards (deletes) the at least part of sound source data after reproducing the at least part of sound source data.

Loudspeaker 34 emits, by a voice, the details of the notification indicated by the at least part of sound source data reproduced by reproducer 32.

3. Operation of Notification System 3-1. First Operation of Notification System

Figure 3:
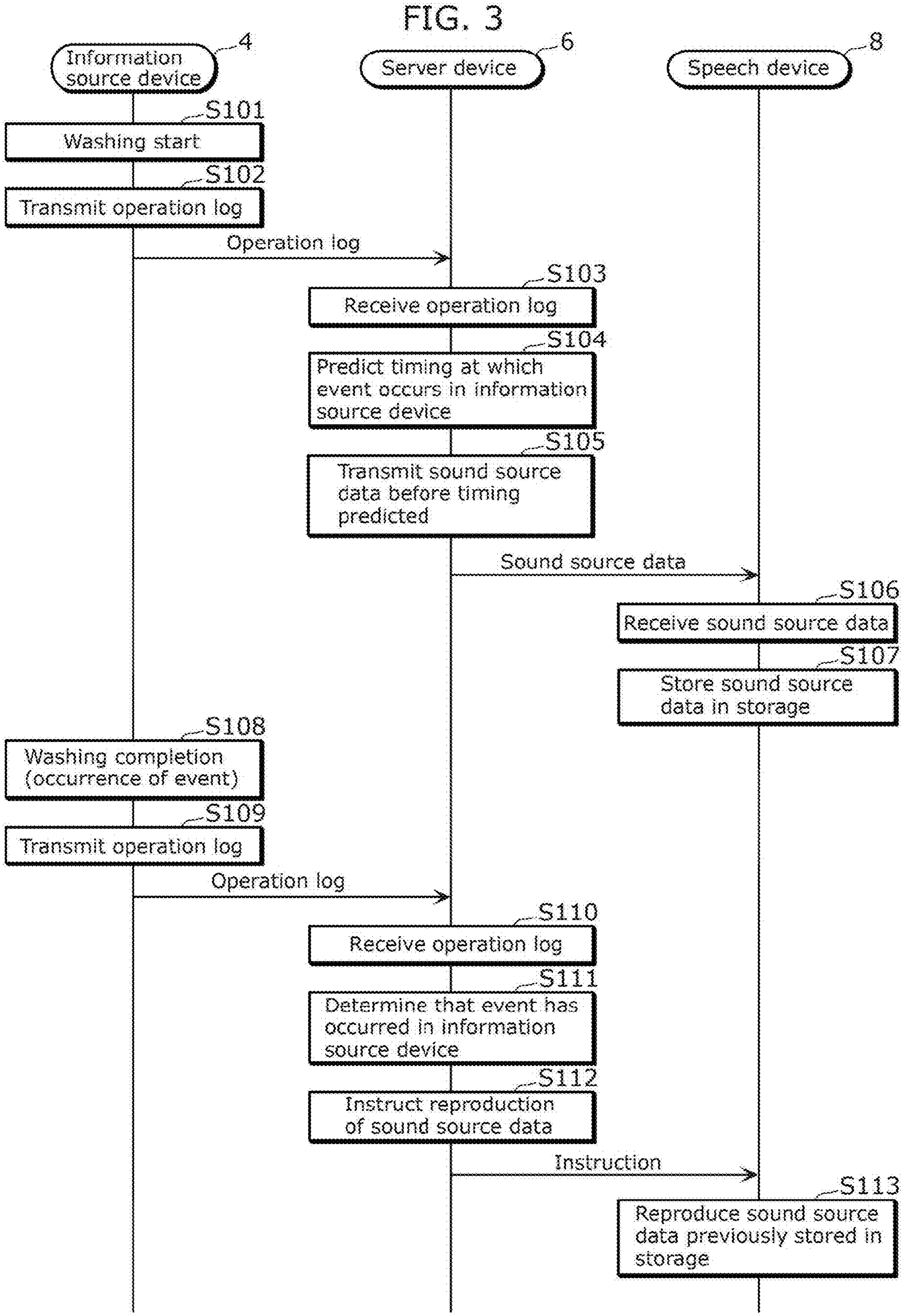
FIG. 3 is a sequence diagram showing the flow of the first operation of the notification system according to the embodiment.
Figure 4:
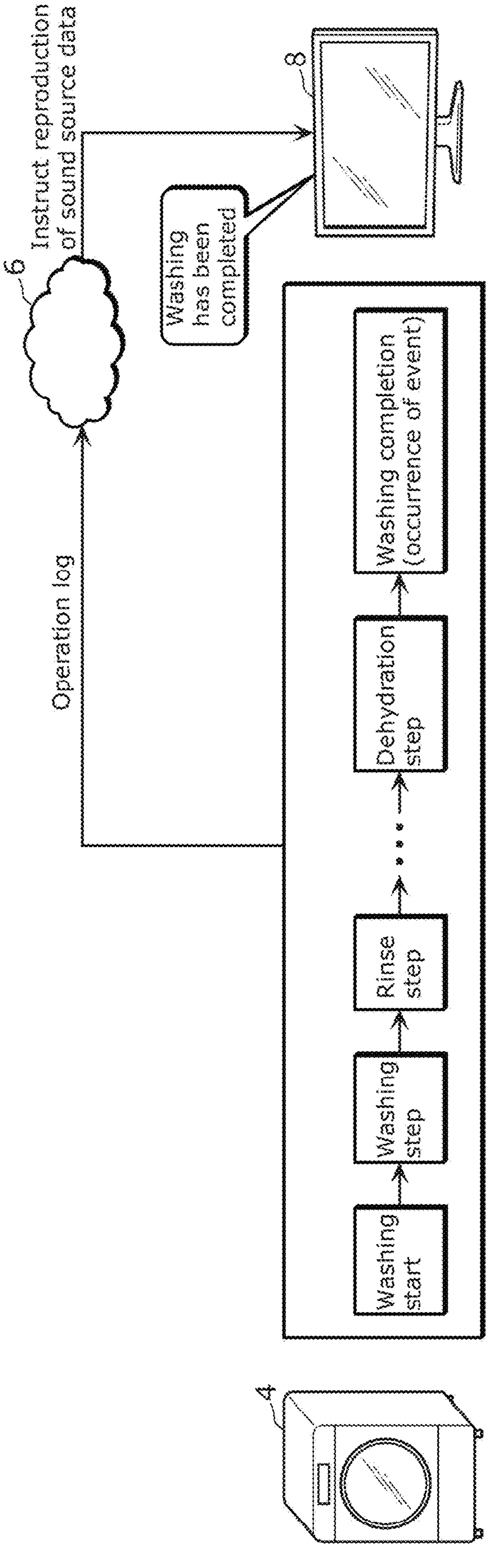
FIG. 4 is a conceptual diagram for illustrating the first operation of the notification system according to the embodiment.

The first operation of notification system 2 according to the embodiment will then be described with reference to FIGS. 3 and 4. FIG. 3 is a sequence diagram showing the flow of the first operation of notification system 2 according to the embodiment. FIG. 4 is a conceptual diagram for illustrating the first operation of notification system 2 according to the embodiment.

As shown in FIG. 3, information source device 4 first starts washing (S101). Then, while a washing operation is being performed by information source device 4, communicator 16 of information source device 4 transmits an operation log indicating an operation history of information source device 4 to server device 6 (S102). As shown in FIG. 4, for example, when each of operations of "washing start", "washing step", "rinse step", . . . , "dehydration step", and "washing completion" is performed in information source device 4, communicator 16 of information source device 4 transmits, to server device 6, the operation log indicating that the corresponding operation has been performed.

Then, communicator 18 of server device 6 receives the operation log from information source device 4 (S103). Then, predictor 22 of server device 6 predicts, based on the operation log received by communicator 18, timing at which an event (for example, "washing completion") occurs in information source device 4 (S104). Here, predictor 22 grasps a time required for each of the steps from the washing start to the washing completion. Hence, for example, when the operation log received by communicator 18 indicates the operation history of the "rinse step", predictor 22 predicts, based on a time required for each of the steps subsequent to the rinse step, that the washing will be completed 20 minutes after the current time.

Then, before the timing predicted by predictor 22, communicator 18 of server device 6 reads, from storage 20, the sound source data for notifying the occurrence of the event in information source device 4 by a voice, and transmits the read sound source data to speech device 8 (S105). For example, communicator 18 transmits, to speech device 8, the sound source data five minutes before the timing predicted by predictor 22 (during the dehydration step). Here, the sound source data transmitted by communicator 18 is the entire sound source data indicating the details of a speech which are, for example, "washing has been completed".

Then, communicator 28 of speech device 8 receives the sound source data from server device 6 (S106), and stores the received sound source data in storage 30 (S107). In other words, before the event occurs in information source device 4, the sound source data is previously stored in storage 30.

Thereafter, washing is completed in information source device 4, that is, the event occurs (S108). Communicator 16 of information source device 4 transmits an operation log indicating the completion of washing to server device 6 (S109).

Then, communicator 18 of server device 6 receives the operation log from information source device 4 (S110). Then, determiner 24 of server device 6 determines whether the event has occurred in information source device 4 based on the operation log received by communicator 18 (S111).

Then, when determiner 24 determines that the event has occurred in information source device 4, instructor 26 of server device 6 instructs, via communicator 18, speech device 8 to reproduce the sound source data (S112).

Then, communicator 28 of speech device 8 outputs the instruction from server device 6 to reproducer 32. Based on the instruction from server device 6, reproducer 32 of speech device 8 reads the sound source data previously stored in storage 30, and reproduces it (S113). In this way, as shown in FIG. 4, immediately after the timing at which the event has occurred in information source device 4, speech device 8 reproduces the sound source data indicating the details of a speech which are, for example, "washing has been completed".

3-2. Second Operation of Notification System

Figure 5:
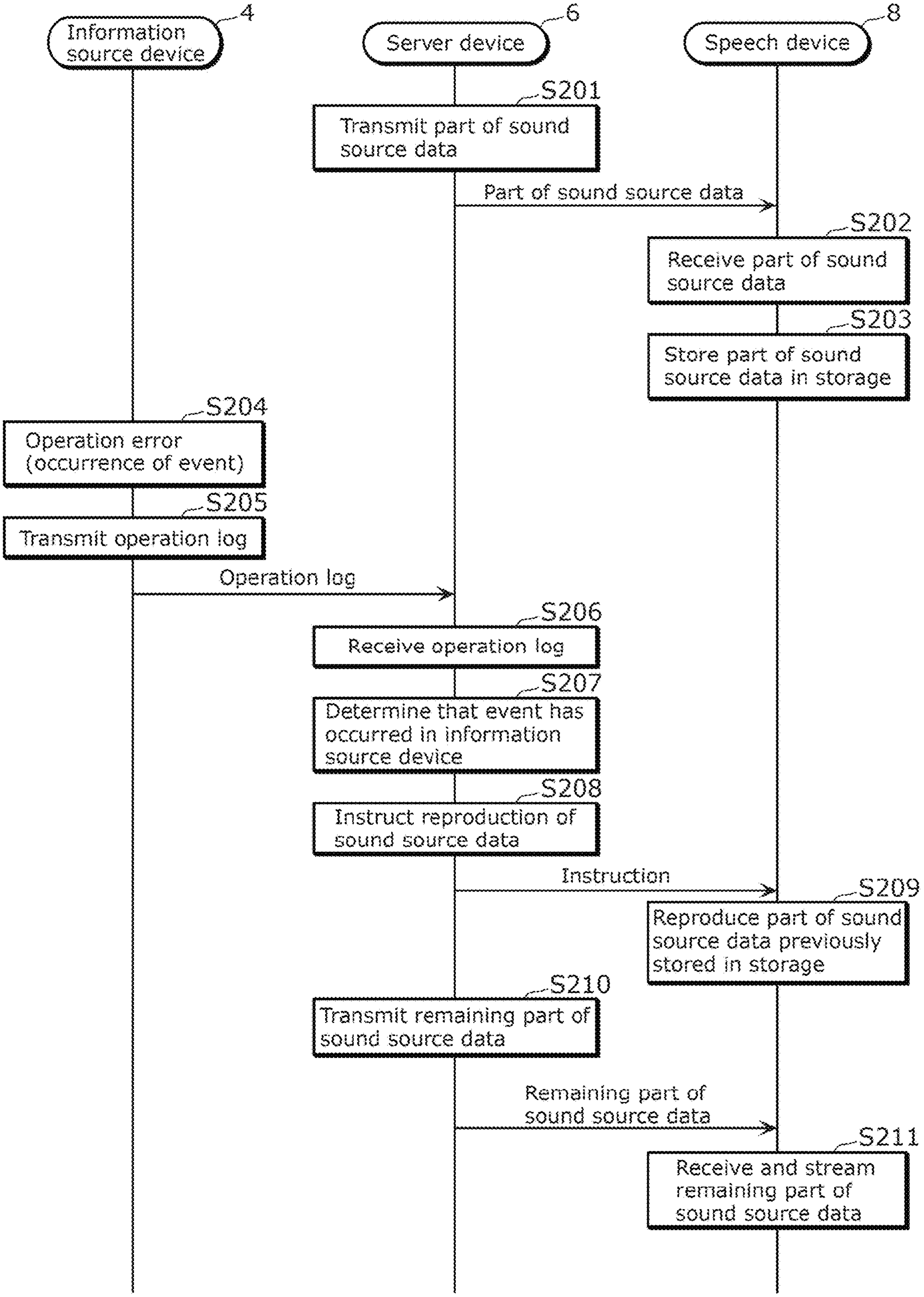
FIG. 5 is a sequence diagram showing the flow of the second operation of the notification system according to the embodiment.
Figure 6:
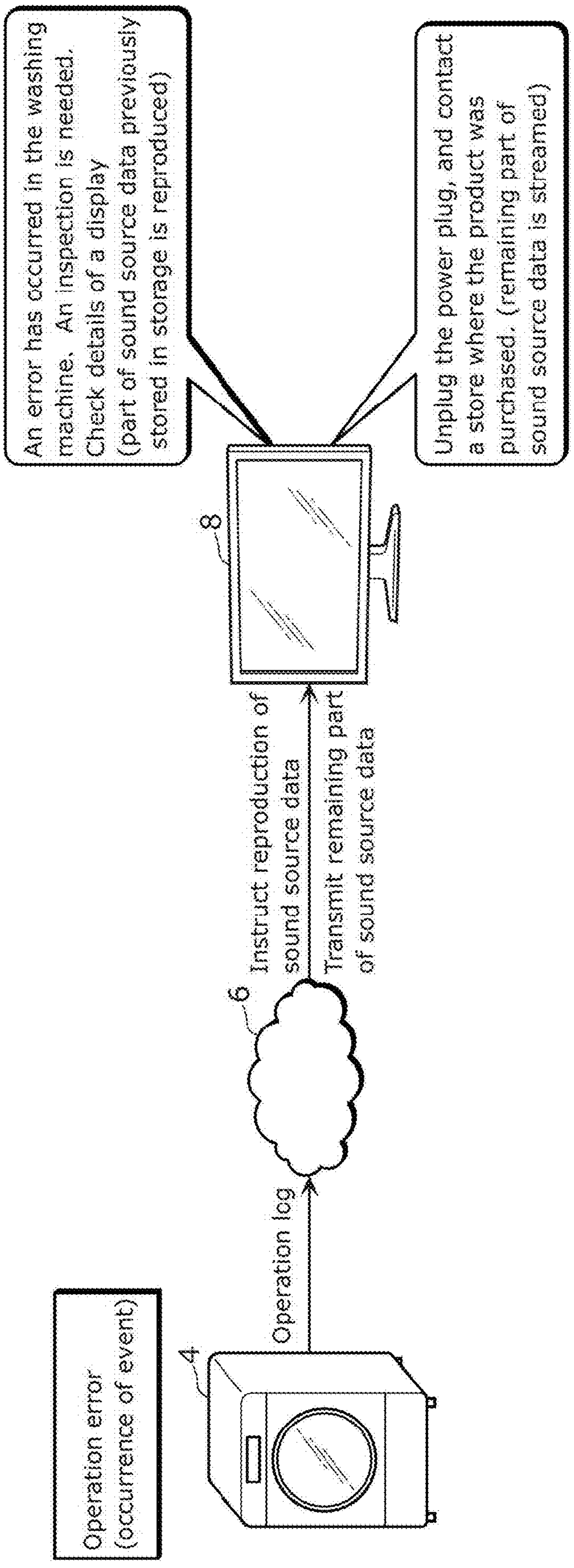
FIG. 6 is a conceptual diagram for illustrating the second operation of the notification system according to the embodiment.

The second operation of notification system 2 according to the embodiment will then be described with reference to FIGS. 5 and 6. FIG. 5 is a sequence diagram showing the flow of the second operation of notification system 2 according to the embodiment. FIG. 6 is a conceptual diagram for illustrating the second operation of notification system 2 according to the embodiment.

First, as shown in FIG. 5, when server device 6 and speech device 8 are first connected to each other, communicator 18 of server device 6 reads, from storage 20, part of sound source data for notifying occurrence of an event (for example, an "operation error") in information source device 4 by a voice, and transmits, to speech device 8, the read part of sound source data (S201). The "first connected" means that speech device 8 and server device 6 are first connected to each other via network 10 after the installation of speech device 8.

Here, for example, when the details of a speech indicated by the sound source data are "An error has occurred in the washing machine. An inspection is needed. Check details of a display, unplug the power plug, and contact a store where the product was purchased.", the details of a speech indicated by the part of sound source data transmitted by communicator 18 are "An error has occurred in the washing machine. An inspection is needed. Check details of a display, ".

Then, communicator 28 of speech device 8 receives the part of sound source data from server device 6 (S202), and stores the received part of sound source data in storage 30 (S203). In other words, before the event occurs in information source device 4, the part of sound source data is previously stored in storage 30.

Thereafter, the operation error occurs in information source device 4, that is, the event occurs (S204). Then, as shown in FIG. 6, communicator 16 of information source device 4 transmits, to server device 6, an operation log indicating the occurrence of the operation error (S205).

Then, communicator 18 of server device 6 receives the operation log from information source device 4 (S206). Then, determiner 24 of server device 6 determines whether the event has occurred in information source device 4 based on the operation log received by communicator 18 (S207).

Then, when determiner 24 determines that the event has occurred in information source device 4, instructor 26 of server device 6 instructs, via communicator 18, speech device 8 to reproduce the sound source data (S208).

Then, communicator 28 of speech device 8 outputs, to reproducer 32, the instruction from server device 6. Reproducer 32 of speech device 8 reads, based on the instruction from server device 6, the part of sound source data previously stored in storage 30, and reproduces it (S209).

In this way, as shown in FIG. 6, with timing at which the event has occurred in information source device 4, speech device 8 starts to reproduce the part of sound source data indicating the details of a speech which are, for example, "An error has occurred in the washing machine. An inspection is needed. Check details of a display,".

While the part of sound source data is being reproduced by speech device 8, communicator 18 of server device 6 reads the remaining part of sound source data from storage 20, and transmits the read remaining part of sound source data to speech device 8 (S210). For example, the details of a speech indicated by the remaining part of sound source data transmitted by communicator 18 are "unplug the power plug, and contact a store where the product was purchased."

Then, communicator 28 of speech device 8 receives the remaining part of sound source data from server device 6, and reproducer 32 of speech device 8 streams the remaining part of sound source data received by communicator 28 (S211).

In this way, as shown in FIG. 6, immediately after the timing at which the event has occurred in information source device 4, speech device 8 reproduces the part of sound source data that is previously stored in storage 30 and indicates the details of a speech which are, for example, "An error has occurred in the washing machine. An inspection is needed. Check details of a display,". Then, speech device 8 streams the remaining part of sound source data indicating the details of a speech which are "unplug the power plug, and contact a store where the product was purchased."

Server device 6 may compare a delay time after the occurrence of the event in information source device 4 until the sound source data is reproduced by speech device 8 and a speech time (in seconds) of the sound source data stored in storage 20 so as to determine which of the part of sound source data and the entire sound source data is transmitted in step S201. For example, when the delay time is less than or equal to the speech time of the sound source data, server device 6 determines that the part of sound source data is transmitted in step S201. On the other hand, when the delay time exceeds the speech time of the sound source data, server device 6 determines that the entire sound source data is transmitted in step S201.

4. Effects

Notification system 2 according to a first aspect of the present disclosure includes: information source device 4; speech device 8 that emits a voice; and server device 6 that communicates with information source device 4 and speech device 8 via network 10. Information source device 4 includes communicator 16 that transmits an operation log indicating an operation history of information source device 4 to server device 6. Server device 6 includes communicator 18 that (i) receives the operation log from information source device 4 and (ii) transmits, to speech device 8, before an event occurs in information source device 4, at least part of sound source data for notifying that the event has occurred in information source device 4 by a voice, determiner 24 that determines whether the event has occurred in information source device 4 based on the operation log, and instructor 26 that provides, via communicator 18, when determiner 24 determines that the event has occurred in information source device 4, an instruction to speech device 8 to reproduce the at least part of sound source data. Speech device 8 includes communicator 28 that receives the at least part of sound source data from server device 6, storage 30 that stores the at least part of sound source data received by communicator 28, and reproducer 32 that reproduces, based on the instruction provided by instructor 26 of server device 6, the at least part of sound source data stored in storage 30.

In this way, before the event occurs in information source device 4, the at least part of sound source data for notifying the occurrence of the event by a voice is previously stored in storage 30 of speech device 8. Thus, immediately after timing at which the event has occurred in information source device 4, reproducer 32 of speech device 8 can reproduce the at least part of sound source data previously stored in storage 30. Consequently, it is possible to reduce a time lag between the occurrence of the event in information source device 4 and the reproduction of the sound source data performed by reproducer 32 of speech device 8.

In notification system 2 according to a second aspect of the present disclosure, in the first aspect, server device 6 further includes predictor 22 that predicts timing at which the event occurs in information source device 4 based on the operation log. Communicator 18 of server device 6 transmits the sound source data to speech device 8 before the timing predicted by predictor 22. Communicator 28 of speech device 8 receives the sound source data from server device 6. Storage 30 of speech device 8 stores the sound source data received by communicator 28. Reproducer 32 of speech device 8 reproduces, based on the instruction provided by instructor 26 of server device 6, the sound source data stored in storage 30.

In this way, predictor 22 predicts the timing at which the event occurs in information source device 4, and thus before the event occurs in information source device 4, the sound source data can easily be stored in storage 30 of speech device 8.

In notification system 2 according to a third aspect of the present disclosure, in the first aspect, communicator 18 of server device 6 transmits a part of the sound source data to speech device 8 before the event occurs in information source device 4. Communicator of speech device 8 receives the part of the sound source data from server device 6. Storage 30 of speech device 8 stores the part of the sound source data received by communicator 28. When determiner 24 of server device 6 determines that the event has occurred in information source device 4, (i) instructor 26 of server device 6 provides, via communicator 18, an instruction to speech device 8 to reproduce the sound source data, and (ii) communicator 18 of server device 6 transmits a remaining part of the sound source data to speech device 8. Reproducer 32 of speech device 8 reproduces, based on the instruction provided by instructor 26 of server device 6, the part of the sound source data stored in storage 20. Communicator 28 of speech device 8 starts to receive the remaining part of the sound source data from server device 6 while the part of the sound source data is being reproduced. Reproducer 32 of speech device 8 streams the remaining part of the sound source data received by communicator 28, following the reproduction of the part of the sound source data.

In this way, reproducer 32 of speech device 8 reproduces the part of the sound source data previously store in storage 30 immediately after the occurrence of the event in information source device 4, and then streams the remaining part of the sound source data from server device 6. In this way, when it takes a relatively long time to reproduce the entire sound source data, the sound source data can be smoothly reproduced while the resources of storage 30 are being saved.

In notification system 2 according to a fourth aspect of the present disclosure, in any one of the first to third aspects, the at least part of sound source data stored in storage 30 of speech device 8 is discarded after being reproduced by reproducer 32 of speech device 8.

In this way, the resources of storage 30 can be saved.

A notification method according to a fifth aspect of the present disclosure is a notification method performed by notification system 2 that includes information source device 4, speech device 8 which emits a voice, and server device 6 which communicates with information source device 4 and speech device 8 via network 10. Notification method includes: (a) transmitting, by information source device 4, an operation log indicating an operation history of information source device 4 to server device 6; (b) receiving, by server device 6, the operation log from information source device 4; (c) transmitting, by server device 6, to speech device 8, before an event occurs in information source device 4, at least part of sound source data for notifying that the event has occurred in information source device 4 by a voice; (d) receiving, by speech device 8, the at least part of sound source data from server device 6; (e) storing, by speech device 8, in storage 30, the at least part of sound source data received in the receiving in (d); (f) determining, by server device 6, whether the event has occurred in information source device 4 based on the operation log received in the receiving in (b); (g) providing, by server device 6, when it is determined, in the determining (f), that the event has occurred in the information source device, an instruction to speech device 8 to reproduce the at least part of sound source data; and (h) reproducing, by speech device 8, the at least part of sound source data stored in storage 30 based on the instruction provided by server device 6.

In this way, it is possible to likewise reduce the time lag between the occurrence of the event in information source device 4 and the reproduction of the sound source data performed by speech device 8.

Server device 6 according to a sixth aspect of the present disclosure is a server device that communicates, via network 10, with information source device 4 and speech device 8 which emits a voice. Server device 6 includes: communicator 18 that (i) receives an operation log indicating an operation history of information source device 4 from information source device 4 and (ii) transmits, to speech device 8, before an event occurs in information source device 4, at least part of sound source data for notifying that the event has occurred in information source device 4 by a voice; determiner 24 that determines whether the event has occurred in information source device 4 based on the operation log; and instructor 26 that instructs, via communicator 18, speech device 8 to reproduce the at least part of sound source data when determiner 24 determines that the event has occurred in information source device 4.

In this way, it is possible to likewise reduce the time lag between the occurrence of the event in information source device 4 and the reproduction of the sound source data performed by speech device 8.

Speech device 8 according to a seventh aspect of the present disclosure is a speech device that emits a voice and communicates with server device 6 via network 10. Speech device 8 includes: communicator 28 that receives, from server device 6, before an event occurs in information source device 4, at least part of sound source data for notifying that the event has occurred in information source device 4 by a voice; storage 30 that stores the at least part of sound source data received by communicator 28; and reproducer 32 that reproduces, when the event occurs in information source device 4, the at least part of sound source data stored in storage 30 based on an instruction provided by server device 6.

In this way, it is possible to likewise reduce the time lag between the occurrence of the event in information source device 4 and the reproduction of the sound source data performed by reproducer 32.

VARIATIONS AND LIKE

As described above, the embodiment has been described as an example of the technique disclosed in the present application. However, the technique disclosed in the present disclosure is not limited to the technique described above, and the present disclosure can be applied to embodiments obtained by performing changes, replacements, additions, omissions and the like as necessary. Embodiments can be newly provided by combining constituent elements described in the above embodiment.

Hence, other embodiments will be described as examples below.

Although in the embodiment described above, information source device 4 and speech device 8 are separate devices, the present disclosure is not limited to this configuration, and information source device 4 and speech device 8 may be the same device.

In the embodiment described above, the constituent elements may be formed by dedicated hardware or may be realized by executing software programs suitable for the constituent elements. A program executor such as a CPU or a processor may read and execute software programs recorded in a non-transitory recording medium such as a hard disk or a semiconductor memory to realize the constituent elements.

A processor such as a CPU may execute programs to realize a part or all of the functions of notification system 2 according to the embodiment described above.

As described above, the embodiment has been described as an example of the technique in the present disclosure. Hence, the accompanying drawings and the detailed description are provided.

Thus, constituent elements provided in the accompanying drawings and the detailed description may include not only constituent elements necessary for solving the issue but also constituent elements which are not necessary for solving the issue in order to illustrate the technique. Therefore, just because the constituent elements which are not necessary are provided in the accompanying drawings and the detailed description, it should not be immediately determined that the constituent elements which are not necessary are necessary.

Since the embodiment described above is intended to illustrate the technique in the present disclosure, various changes, replacements, additions, omissions and the like can be performed in the scope of claims or a scope equivalent thereto.

INDUSTRIAL APPLICABILITY

The present disclosure can be applied as a notification system or the like in which, for example, each time an event occurs in an information source device, a speech device uses a voice to notify a user of the occurrence of the event.

REFERENCE SIGNS LIST

2 notification system
4 information source device
6 server device
8 speech device
10 network
12 user
14 home
16, 18, 28 communicator
20, 30 storage
22 predictor
24 determiner
26 instructor
32 reproducer
34 loudspeaker

The invention claimed is:

1. A notification system comprising:
an information source device;
a speech device that emits a voice; and
a server device that communicates with the information source device and the speech device via a network, wherein the information source device includes a first processor configured to perform first operations comprising transmitting an operation log indicating an operation history of the information source device to the server device, the server device includes a second processor configured to perform second operations comprising:

predicting timing at which an event occurs in the information source device based on the operation log, receiving the operation log from the information source device, and transmitting, to the speech device, before (i) the event occurs in the information source device and (ii) the timing predicted in the predicting, sound source data for notifying that the event has occurred in the information source device by a voice, determining whether the event has occurred in the information source device based on the operation log, and providing, in response to determining that the event has occurred in the information source device, an instruction to the speech device to reproduce the sound source data, the speech device includes a storage and a third processor configured to perform third operations comprising:

receiving the sound source data from the server device, storing, in the storage, the sound source data received in the receiving, and reproducing, based on the instruction, the sound source data stored in the storage.

2. A notification system comprising:

an information source device;

a speech device that emits a voice; and a server device that communicates with the information source device and the speech device via a network, wherein the information source device includes a first processor configured to perform first operations comprising transmitting an operation log indicating an operation history of the information source device to the server device, the server device includes a second processor configured to perform second operations comprising receiving the operation log from the information source device and determining whether an event has occurred in the information source device based on the operation log, and the speech device includes a storage and a third processor configured to perform third operations, the second operations further comprise transmitting a part of sound source data to the speech device before the event occurs in the information source device, the third operations comprise receiving the part of the sound source data from the server device, the third operations further comprise storing, in the storage, the part of the sound source data received in the receiving, the second operations further comprise, when the second processor determines that the event has occurred in the information source device, (i) providing an instruction to the speech device to reproduce the sound source data, and (ii) transmitting a remaining part of the sound source data to the speech device, the third operations further comprise reproducing, based on the instruction provided by the server device, the part of the sound source data stored in the storage, the third operations further comprise starting to receive the remaining part of the sound source data from the server device while the part of the sound source data is being reproduced, and the third operations further comprise streaming the remaining part of the sound source data received from the server device, following the reproduction of the part of the sound source data.

3. The notification system according to claim 1, wherein the third operations further comprise discarding the sound source data stored in the storage reproducing the sound source data.

4. A notification method performed by a notification system that includes an information source device, a speech device which emits a voice, and a server device which communicates with the information source device and the speech device via a network, the notification method comprising:

(a) transmitting, by the information source device, an operation log indicating an operation history of the information source device to the server device;

(b) receiving, by the server device, the operation log from the information source device;

(c) predicting, by the server device, timing at which an event occurs in the information source device based on the operation log received in (b);

(d) transmitting, by the server device, to the speech device, before the event occurs in the information source device and before the timing predicted in (c), sound source data for notifying that the event has occurred in the information source device by a voice;

(e) receiving, by the speech device, the at least part of sound source data from the server device;

(f) storing, by the speech device, in a storage, the at least part of sound source data received in the receiving in (e);

(g) determining, by the server device, whether the event has occurred in the information source device based on the operation log received in the receiving in (b);

(h) providing, by the server device, when it is determined, in the determining in (g), that the event has occurred in the information source device, an instruction to the speech device to reproduce the sound source data; and (i) reproducing, by the speech device, the sound source data stored in the storage, based on the instruction provided by the server device.

5. A notification method performed by a notification system that includes an information source device, a speech device which emits a voice, and a server device which communicates with the information source device and the speech device via a network, the notification method comprising:

(a) transmitting, by the information source device, an operation log indicating an operation history of the information source device to the server device;

(b) receiving, by the server device, the operation log from the information source device;

(c) transmitting, by the server device, to the speech device, before an event occurs in the information source device, a part of sound source data for notifying that the event has occurred in the information source device by a voice;

(d) receiving, by the speech device, the part of the sound source data from the server device;

(e) storing, by the speech device, in a storage, the part of the sound source data received in (d);

(f) determining, by the server device, whether the event has occurred in the information source device based on the operation log received in (b);

(g) in response to determining in (f) that the event has occurred in the information source device, providing, by the server device, an instruction to the speech device to reproduce the sound source data and transmitting, by the server device, a remaining part of the sound source data to the speech device;

(h) reproducing, by the speech device, the part of the sound source data stored in the storage based on the instruction provided by the server device;

(i) starting, by the speech device, reception of the remaining part of the sound source data from the server device while the part of the sound source data is being reproduced; and (j) streaming, by the speech device, the remaining part of the sound source data received in (i), following the reproduction in (h) of the part of the sound source data.

* * * * *